(12) United States Patent
Zeng

(10) Patent No.: US 11,882,174 B2
(45) Date of Patent: Jan. 23, 2024

(54) VIRTUAL MACHINE AS A SERVICE FOR AN AUTONOMOUS EDGE

(71) Applicant: VMware LLC, Palo Alto, CA (US)

(72) Inventor: Helen Zeng, Palo Alto, CA (US)

(73) Assignee: VMWare, Inc., Palo Alto, CA (US)

( * ) Notice: Subject to any disclaimer, the term of this patent is extended or adjusted under 35 U.S.C. 154(b) by 0 days.

(21) Appl. No.: 17/577,135

(22) Filed: Jan. 17, 2022

(65) Prior Publication Data

US 2023/0231903 A1 Jul. 20, 2023

(51) Int. Cl.
*G06F 15/173* (2006.01)
*H04L 67/1008* (2022.01)
*H04L 41/12* (2022.01)

(52) U.S. Cl.
CPC .......... *H04L 67/1008* (2013.01); *H04L 41/12* (2013.01)

(58) Field of Classification Search
None
See application file for complete search history.

(56) References Cited

U.S. PATENT DOCUMENTS

| 10,827,033 | B1 | 11/2020 | Balasubramanian |
| 2019/0116128 | A1* | 4/2019 | Guo ..................... H04L 67/101 |
| 2019/0229990 | A1 | 7/2019 | Patel |
| 2020/0028731 | A1* | 1/2020 | Luo ..................... H04L 41/0668 |
| 2020/0322225 | A1 | 10/2020 | Alamouti |
| 2020/0351336 | A1* | 11/2020 | Campbell ........... H04L 67/1008 |
| 2022/0014588 | A1 | 1/2022 | Bernat |

OTHER PUBLICATIONS

International Search Report and Written Opinion dated May 17, 2023 for PCT/US23/010838.

* cited by examiner

*Primary Examiner* — Wing F Chan
*Assistant Examiner* — Andrew Woo
(74) *Attorney, Agent, or Firm* — King Intellectual Asset Management

(57) ABSTRACT

Systems and methods are described for providing a virtual machine ("VM") as a service. A user device can install a VM to enable itself as an edge node. The user device can then and use a portion of its computing resources to provide the service to the endpoint device by running the VM. In an example, an edge node can directly receive a request for a service from an endpoint device. The edge node can determine that it needs assistance from another device to jointly provide the service. Then another user device which is available to operate as an edge node can join the edge team.

20 Claims, 8 Drawing Sheets

VIRTUAL MACHINE AS A SERVICE FOR AN AUTONOMOUS EDGE

BACKGROUND

Software as a service ("SaaS") is becoming an increasingly popular model for distributing software. Under SaaS models, the software is licensed to customers on a subscription basis and centrally hosted. This allows businesses to charge customers perpetually for use while at the same time providing customers with the most up-to-date versions of their software. The businesses can also expand or reduce the number of servers used to provide the software based on the demand. More and more SaaS services are cloud based, giving customers great flexibility in usage and access. These advantages have strengthened the desire and demand for SaaS capabilities with more software related products.

It is anticipated that upcoming communications systems, such as 6G, will include the autonomous edge capability, which is where any computing node can serve as edge node to provide edge computing service, and a user can easily find nodes to serve its edge computing needs. The autonomous edge can be anywhere, at any time. However, autonomous edges are still restricted to using computing devices that are solely dedicated to functioning as an edge node, which can limit the reach and flexibility of an autonomous edge.

As a result, a need exists for a way to use traditionally non-edge devices as an edge node.

SUMMARY

Examples described herein include systems and methods for providing a VM as a service for an autonomous edge. In an example, a group of computing devices can be selected to operate as edge nodes in an edge computing platform. Computing devices can include any processor-based devices. These computing devices, referred to throughout as "edge nodes" or just "nodes," can include computing devices that are part of a network infrastructure, such as access points or servers, and other types computing devices generally used for non-edge purposes, such as cell phones, tablets, or computers. Computing devices that are not generally used for edge purposes are referred to throughout as "user devices." In an example, user devices can be configured to temporarily join an edge cluster and act as an edge node. For example, user devices can include an application that can dynamically enable and disable an edge mode, which can be a mode where the user device is configured to operate as an edge node. This type of application is referred to throughout as a "VM edge application."

In an example, when edge mode is enabled on a user device, the VM edge application can configure the user device to function as an edge node by installing a VM. For example, the VM edge application can reserve all or a portion of the user device's available computing resources for use by the VM. The VM can then utilize the user device's computing resources to provide edge services to endpoint devices near the user device. These computing resources can include, as an example, central processing unit ("CPU") capacity, memory, disk space, and network bandwidth. An endpoint device can include any network-capable computing device, like a personal computer, tablet, cell phone, server, connected car, or Internet of Things ("IoT") device, such as a Voice Over Internet Protocol ("VOIP") phone, camera, sensor, or similar devices.

In an example, the VM installed on the user device can be assigned by a VM management system ("VMM system") that provides and manages VMs. For example, after configuring the user device in the edge mode, the VM edge application can notify a VMM system that the user device is available to operate as an edge node. In one example, the user device can request the type of VM based on its own preference. In another example, the VMM system can suggest a VM type to assign to the user device. For example, each VM can provide one or more services, and the VMM system can assign a VM to the user device based on demands for services in the geographic area of the user device. The VMM system can notify the user device of the VM assigned to it, and the user device can download and install the VM. Alternatively, if the VM is already installed on the user device, the user device can simply load the VM. The user device can then provide associated edge services by running the VM.

In one example, the user device can become a lead edge node or join a team by request of a lead edge node. For example, when an endpoint device need access to a service, the endpoint device can identify nearby edge nodes for that service and select a node based on a variety of factors, such as computing resource availability, network speed, whether an edge node is in motion, and a reputation score assigned to edge nodes. The reputation score can be assigned by the VMM system based on various performance metrics, such as CPU power, network connection speed, amount of time spent in edge mode, and historical events relating to reliability as an edge node. For example, the VMM system can increase the score for increased time spent in edge mode and successfully providing an edge service to an endpoint device, and decrease the score for poor network connection and terminating an edge service before the service is completed. After being selected by an endpoint device, the selected node can determine whether it has sufficient computing resources to provide the requested service. If so, the node can begin providing the service to the endpoint device. If not, then the node can select one or more other qualified nodes to assist. A group of edge nodes providing the same service to an endpoint device is referred to throughout as an "edge team." In an example, the node selected by the endpoint device becomes the lead edge node (or just "lead node") in the team.

If at any point the lead node determines that additional computing resources are needed to provide edge services to the endpoint device, the lead node can recruit another edge node to join its edge team. For example, the lead node can identify another node that is available in edge mode and instruct the edge node to assist in providing edge services to the endpoint device. As an example, the lead node can determine that the user device is available and qualifies for assisting in providing the needed edge operations. Edge operations can refer to computing tasks associated with an edge service. The lead node can instruct the user device to begin providing edge services to the endpoint device. The VM executing on the user device can perform the edge operations. In an example, the lead node can provide the VMM system with status updates about the edge nodes in the team, such as when an edge node is and is not actively providing an edge service, available computing resources of the edge nodes, and if an edge node suddenly becomes unreachable.

In an example, the lead edge node can redistribute edge operations when an edge node in the edge team becomes unavailable. The method of doing so can depend on how the edge node becomes unavailable. In one example, the VM edge application can allow a user to request to disable edge mode on his or her user device so that the user can regain full control of the user device. The VMM system can check the latest status update of the user device to determine whether the user device is actively performing an edge operation for an endpoint device. If not, the VMM system can approve the request, and the VM edge application can take the user device out of edge mode. If so, then the VMM system can instruct the user device to wait until the edge operation has completed. In one example, the user device can display a message with wait instructions so that the user knows that the user device needs to finish its current edge operation before disabling edge mode. Once the VMM system receives an update that the edge operation has completed, the VMM system can approve the request, and the VM edge application can take the user device out of edge mode.

In one example, the VM edge application can give the user the option to override the wait instruction, such as by selecting an override button in a user interface ("UI") of the VM edge application. If the user selects the override option, then the VMM system can instruct the lead edge application to immediately search for another edge node to replace the user device in the edge team. If the user device is the lead edge node, then a new lead edge node can be selected. The new lead edge node can be selected by the VMM system, the endpoint device, or other nodes in the edge team, depending on the example. The lead edge node, edge team, or endpoint device can analyze the available computing resources of other nodes in the area, identify an edge node for transferring the edge operation, and facilitate the transfer. After the edge operations have been successfully transferred, the VMM system can instruct the VM edge application to disable edge mode at the user device.

In one example, an edge node can suddenly become unavailable while actively providing edge services to an endpoint device. For example, the edge node can suddenly lose its network connection, move out of range from the edge team, or power down without warning. In response, a new edge node can be selected for replacement. The lead edge node, edge team members, or endpoint device, depending on the example, can assess other edge nodes in the area and identify another edge node that can resume the edge operations. In one example, the lead edge node can communicate with the endpoint device to obtain information needed to continue the edge operation. In an example, if the lead edge node becomes unavailable during the session, the endpoint node and other available edge nodes can select a new lead edge node.

In some examples, the lead node can handle requests to disable edge mode from edge team members. For example, the lead edge node can permit or deny disable requests, send wait instructions, find replacement nodes, and so on. In one example, the lead edge node can send information about the team nodes to the VMM system, such as when a node assists in providing edge services, when a node overrides instructions to wait for disabling edge mode, and when a node unexpectedly becomes unavailable. The VMM system can then create or adjust reputation scores for the edge nodes.

In one example, users that allow their user devices to be used for edge services can be compensated for letting their user devices be used as an edge node. For example, a user can be financially compensated for each time the user's device is made available as an edge node and each time the user device performs edge services. In one example, the compensation can vary based on the user device's reputation score. For example, compensation can be increased for a higher score and decreased for a lower score. As an example, if a user pulls a user device out of edge mode while the user device is actively providing edge services to an endpoint device, then the compensation to the user can be reduced or eliminated.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for providing a virtual machine ("VM") as a service. A user device can enable an edge mode that allows the user device to be used as an edge node. A VMM system can assign a VM associated with a one or more services to the user device. The user device can install the VM and make itself available to endpoint devices as an edge node. Upon receiving a request from an endpoint device for a service associated with the VM, the user device can determine whether it has sufficient resources to provide the requested service. If so, the user device can provide the service through the VM. If not, the user device can select one or more additional edge nodes and form an edge team. The user device can distribute edge operations among edge nodes in the team. In one example, while performing an edge operation, the user device can request to disable edge mode. The user device can be instructed to wait until the edge operation is complete before disabling edge mode. In one example, the user can override the wait instruction, and the edge operations can be transferred to another edge node. In one example, the user device can suddenly become unavailable. Another edge node can be assigned to take the place of the user device and continue edge operations.

Figure 1A:
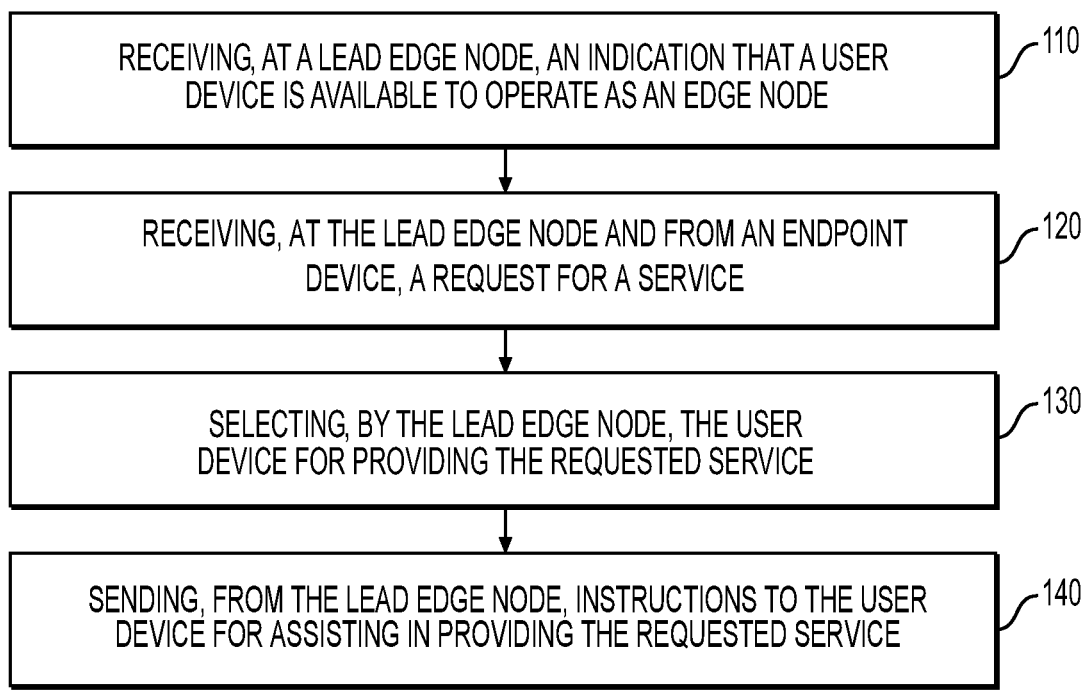
FIG. 1A is an illustration of an example method for providing a VM as a service.
Figure 1B:
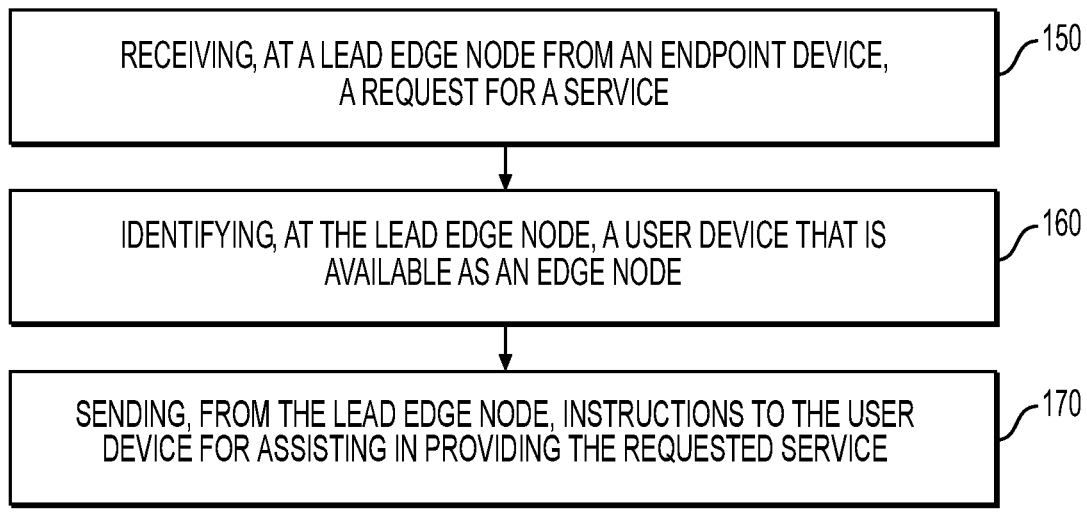
FIG. 1B is an illustration of another example method for providing a VM as a service.
Figure 2:
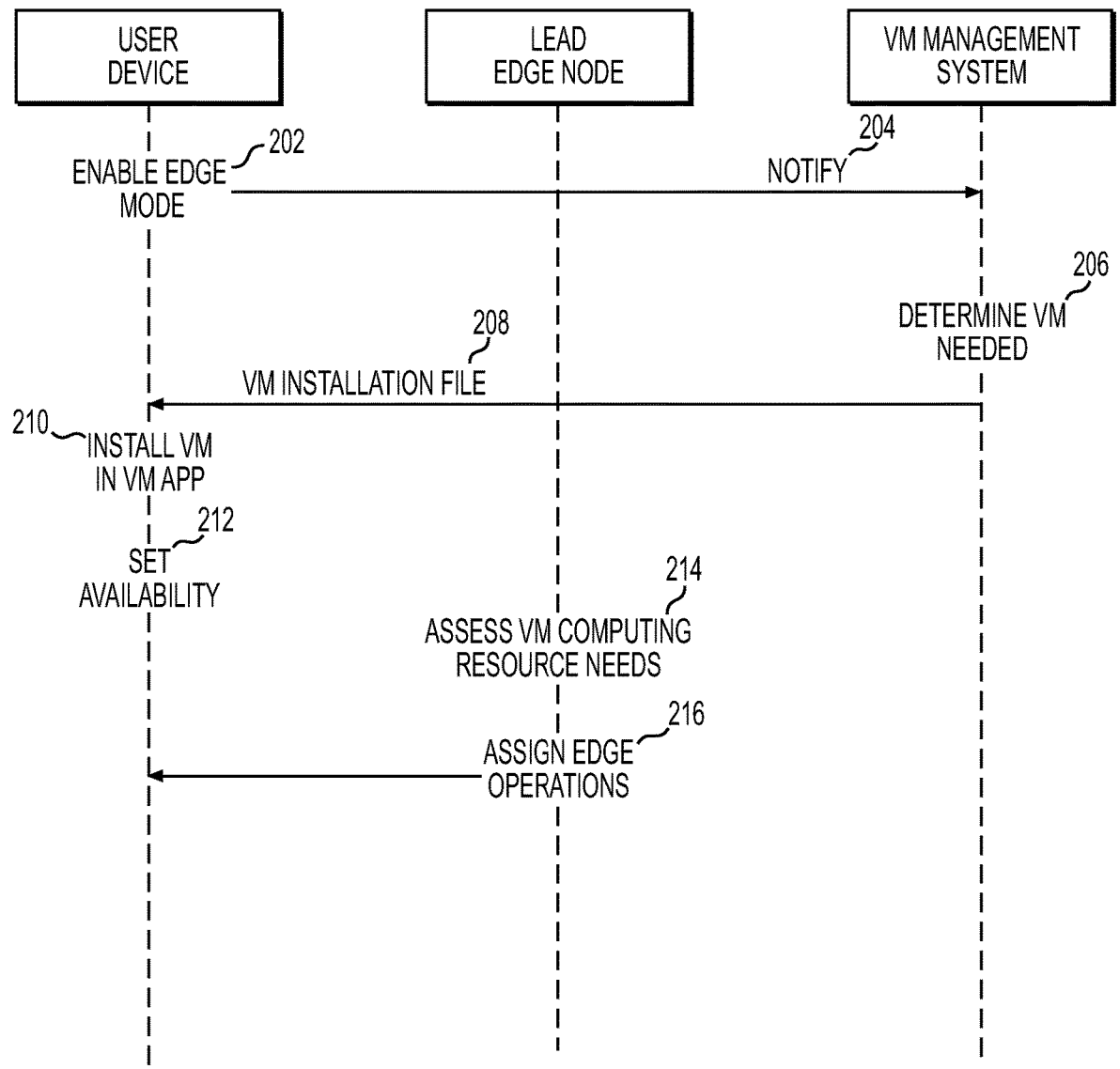
FIG. 2 is a sequence diagram of an example method for providing a VM as a service.
Figure 3:
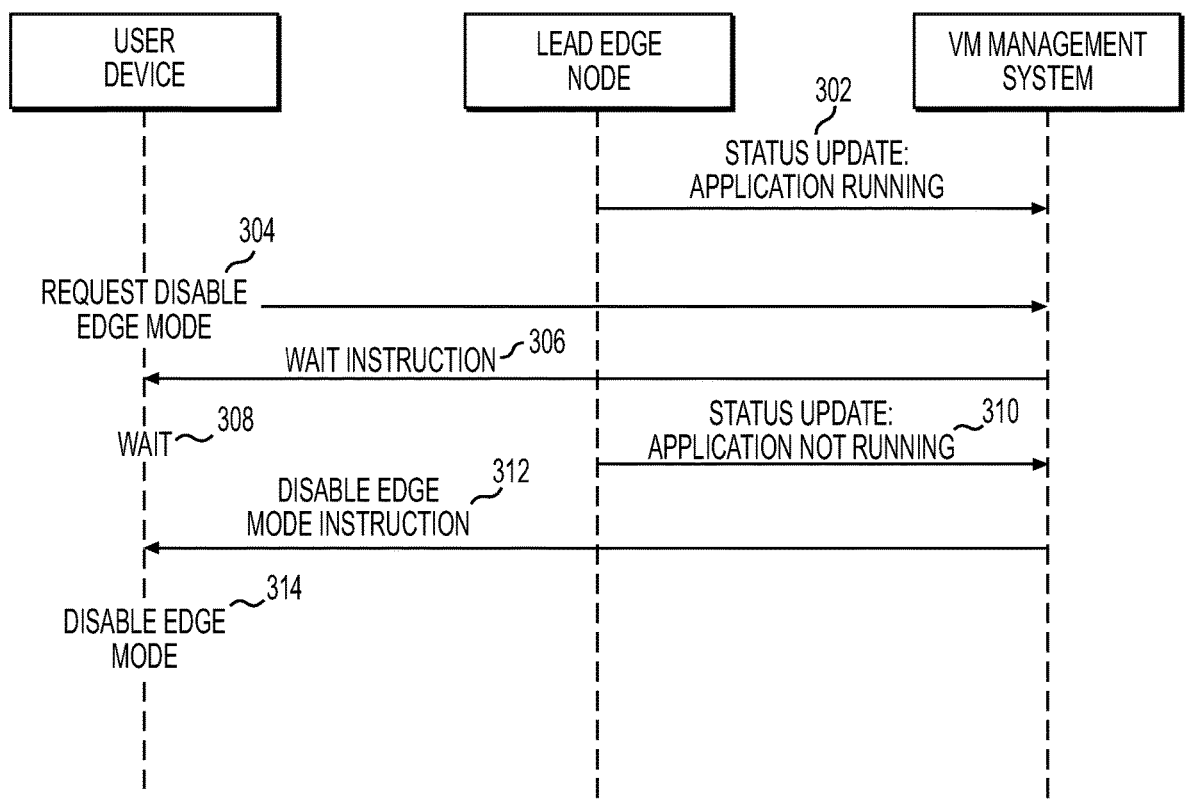
FIG. 3 is another sequence diagram of an example method for providing a VM as a service.
Figure 4:
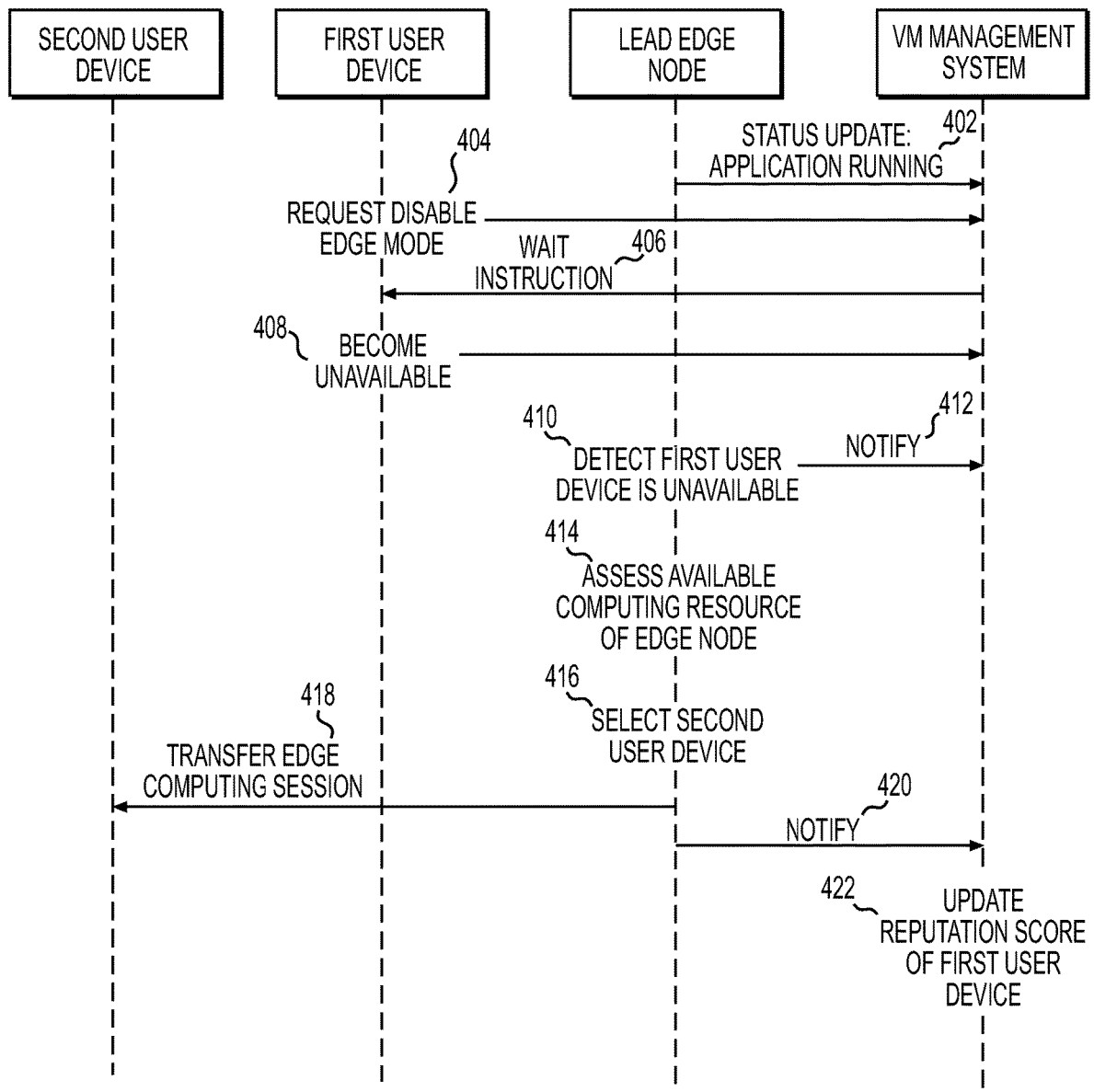
FIG. 4 is another sequence diagram of an example method for providing a VM as a service.
Figure 5:
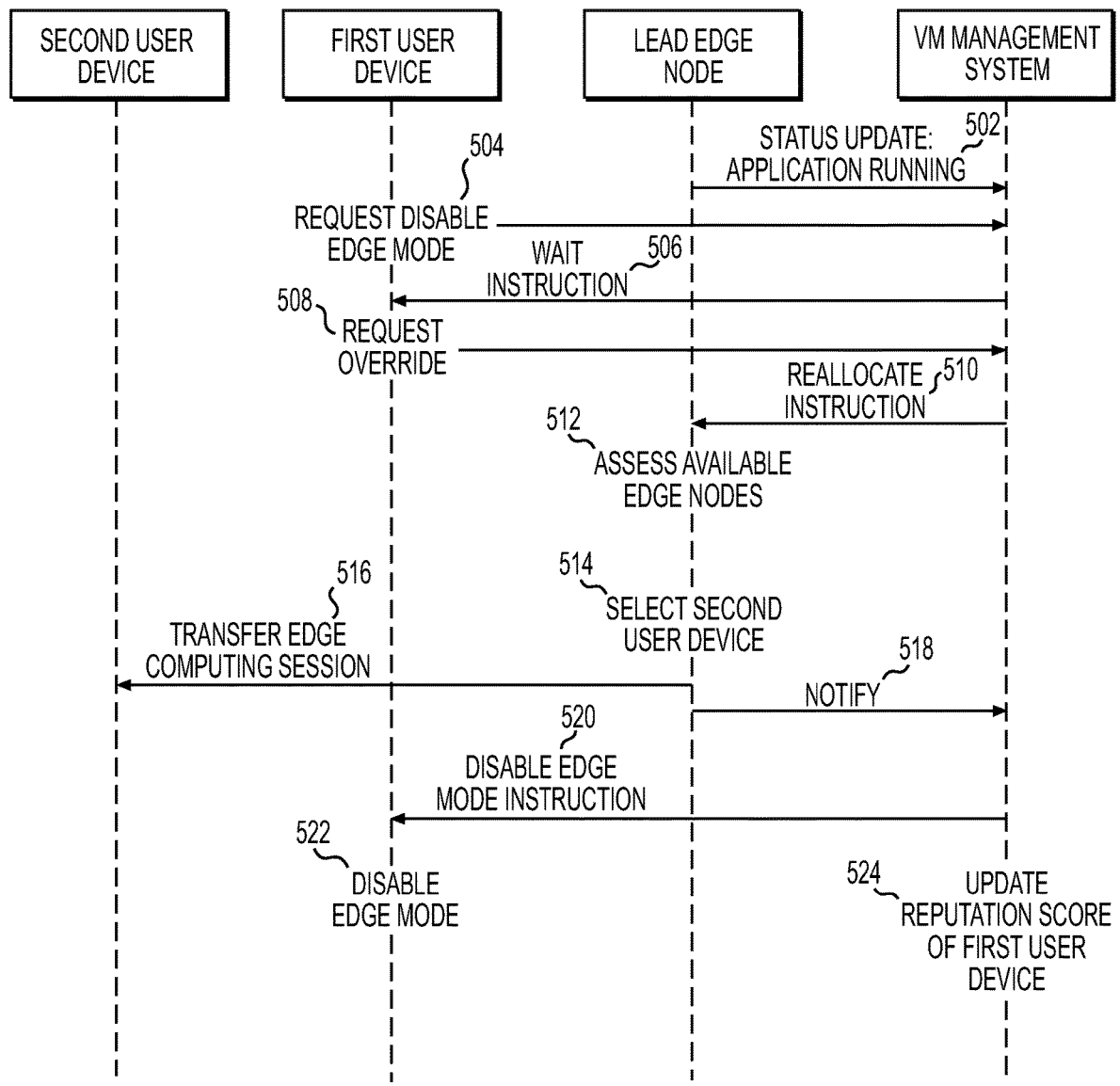
FIG. 5 is another sequence diagram of an example method for providing a VM as a service.
Figure 6:
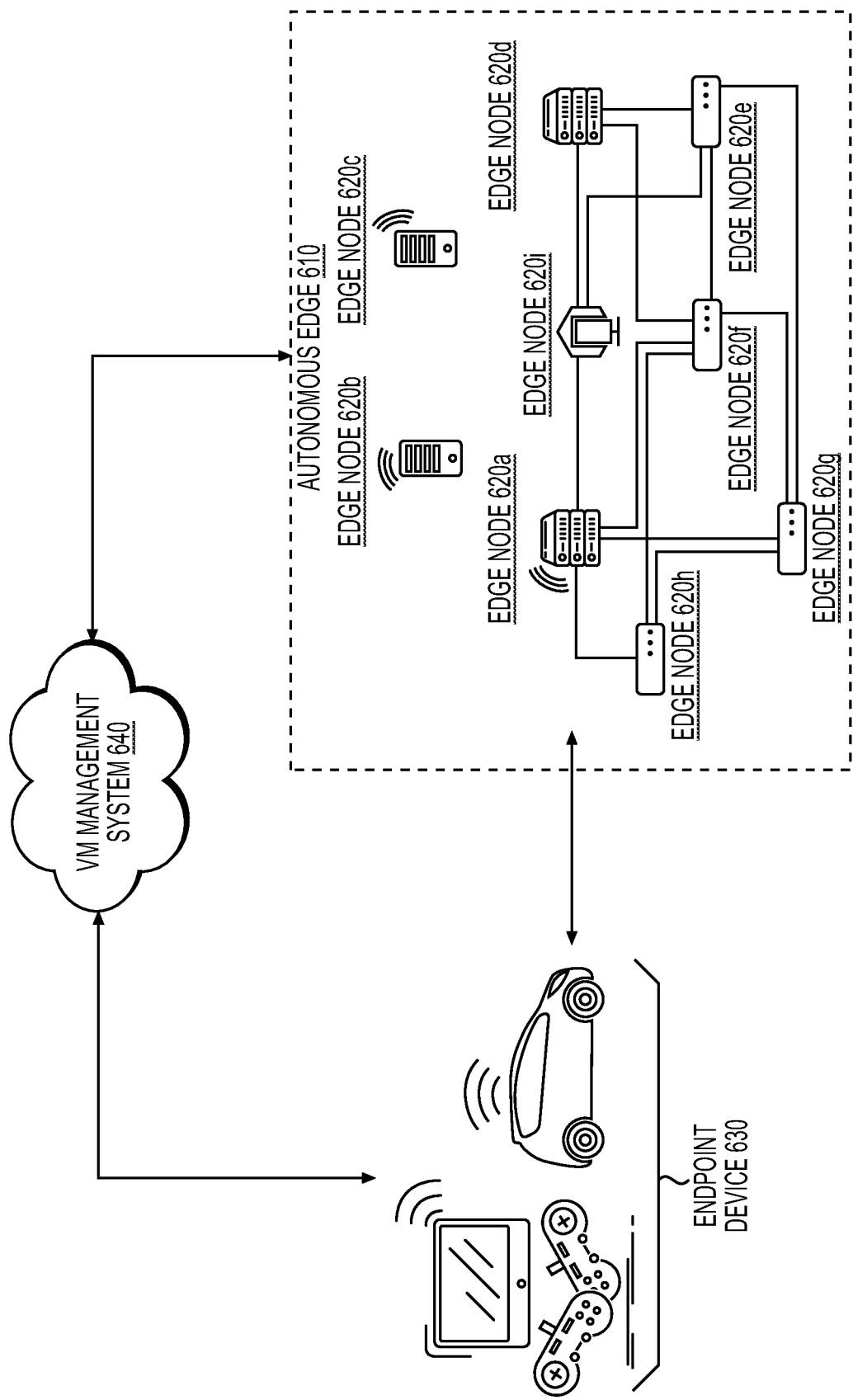
FIG. 6 is an illustration of an example system for providing a VM as a service.
Figure 7:
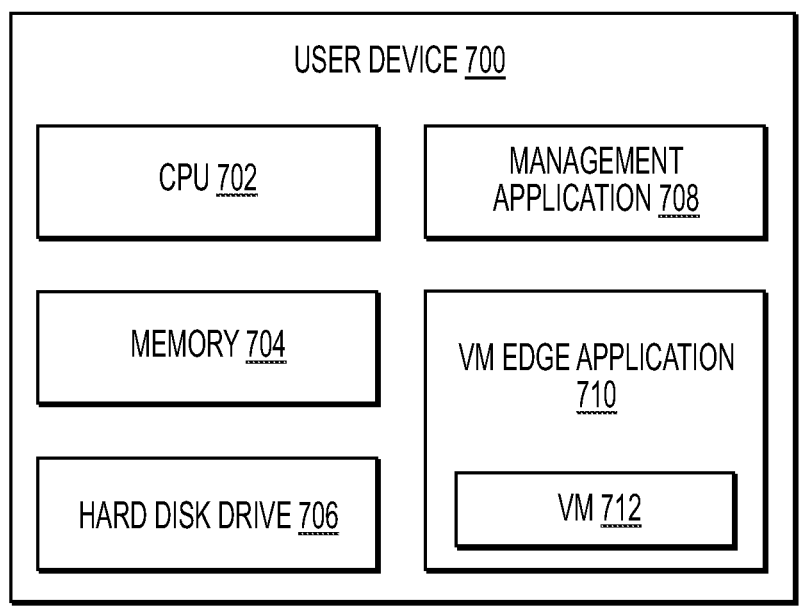
FIG. 7 is an illustration of an example edge device for providing a VM as a service.

FIGS. 1A and 1B are illustrations of an example methods for providing a VM as a service that describes stages performed by a lead edge node that manages the distribution of edge services among a team of edge nodes. The example method of FIG. 1A shows how the lead edge node in an autonomous edge can distribute edge services to other nodes previously assigned to provide the same edge services as the lead edge node. The example method of FIG. 1B shows how the lead edge node in an autonomous edge can dynamically assign edge services to user devices. FIG. 2 is a sequence diagram of the example method described in FIG. 1A. FIGS. 3, 4, and 5 are sequence diagrams for three different example methods for handling a user device operating as an edge node becoming unavailable or requesting to become unavailable for edge-related operations. FIG. 6 is an illustration of an example system for providing a VM as a service. FIG. 7 is an illustration of an example-user device that can operate as an edge node.

FIG. 1A is an illustration of an example method for providing a VM as a service. In an example, the method can be performed in an autonomous edge. The autonomous edge can be an edge system that dynamically adds and removes edge nodes based on availability and need. Each edge node can be a processor-based device, such as a wired or wireless access point, server, or a user device, such as, smart phone, or tablet.

In one example, user devices operating as edge nodes can include an application or software package (e.g., the previously described "VM edge application") that allows for selective or dynamic enabling or disabling of edge functionality. When edge functionality is enabled, the user device can serve as an edge node in sharing the distribution of services to endpoint devices. For example, a user, using the VM edge application, can enable the user device as an edge node. This makes the user device a part-time edge node.

In an example, the edge nodes in the autonomous edge can communicate with each other while one of them is the lead edge node. For example, when an endpoint device needs access to a service, the endpoint device can identify nearby edge nodes within range that can provide the service, and the endpoint device retrieve information about their computing resource availability, mobility, network connection information, access permissions, and a reputation score. Using a set of rules or parameters, the endpoint device can choose a lead edge node for providing the requested service. When an edge node receives a request for a service from an endpoint device, the edge node can determine whether it can handle the request without assistance. If at any point the lead edge node determines that additional computing resources are needed, then the lead edge node can select another edge node to join its team. In some examples, the lead edge node can select a user device that is temporarily available to operate as an edge node.

Examples of computing resource availability can include CPU capacity, available random-access memory ("RAM"), and available hard disk space. An example of mobility can refer to whether the edge node is moving or stationary. Examples of network connection information can include the signal strength, speed, and packet loss rate of the edge node. An example of access permissions can refer to an authorization level assigned to the edge node. In an example, the edge nodes and endpoint devices can use scoring metrics to score each edge node. When an endpoint device needs access to a service, the endpoint device can select the edge node with the highest score. Likewise, when a lead edge node selects another edge to join its team, the available edge node with the highest score can be added. In one example, each edge node can calculate its own score and share the score with the other edge nodes. In another example, the rules or parameters for selecting the lead edge node can be set by an administrator ("admin").

In an example, the VMM system can assign a VM to the user device. For example, for endpoint devices to talk to a backend service, the endpoint devices need a way to access the backend. Access to the backend starts at the edge. The user device can load and run a particular VM for handling the edge interactions with the endpoint devices that need backend access. The VM at the user device can provide certain Application Programming Interface ("API") type calls that can be made back and forth with the endpoint devices. Said another way, the user device is receiving and sending communications to the endpoint devices using the VM that is running at the user device courtesy of the VM edge application. In an example, the VMM system can send an installation file to the user device that the user device can use to install the VM. In an alternative example, the VM can already be installed on the user device, and the user device can simply load the VM. For example, if the user device previous installed the VM, the VM can persist on the user device. In one example, the VM application on the user device can manage VM installs. The VM application can allow a maximum number of VMs to simultaneously persist on the user device, such as one or two. If the maximum number of VMs persist on the user device and the VMM system assigns a new third VM, then the VM application can delete one VM persisting on the user device and replace it with the third VM. In one example, the maximum number of VMs that can persist on the user device can depend on the computing resources of the user device.

In one example, the VMM system can assign one or more specific VMs to edge nodes. For example, the VMM system can assign two VMs to the user device, and the user device can install and locally store those VMs. When the first user device is available to operate as an edge node, the VMM system can instruct the user device to operate as an edge node for one of the two assigned VMs. In one example, the VM application can be configured to activate its corresponding device based on instructions from the VMM system. For example, if the VMM system gets notification from lead edge node that more edge computing resources are needed for a particular application, the VMM system can select an edge node to install a VM. The VMM system can send instructions to that node to activate edge operations on a VM. The VM application can then dedicate some or all available computing resources for providing edge services associated through the VM.

The VMM system can have the ability to perform other management functions. For example, the VMM system can remotely turn VMs of services on or off as needed. The VMM system can determine reputation scores and pay rates for user devices that provide edge services. This can be based on behavior information received from lead edge nodes. In one example, the VMM system can allow edge nodes to select a VM, which can vary by operating system, disk size, required computing power, and so on. In another example, the VMM system can install other edge related software on a VM. This can include updating a VM or adding software to a VM already installed on a user device.

In some examples, the VMM system can include multiple instances that operate independently. For example, instances of the VMM system can be distributed to geographic regions. The instances can synchronize with each other either on a schedule or on-demand. During a synchronization, the instances can exchange information about edge operations, such as the VMs, demand for services, and the behavior, status, and reputation score of edge nodes. In one example, this data can be analyzed and used to train machine learning models for use in other management capabilities.

Moving to stage 110, a lead edge node can receive an indication that a user device is available to operate as an edge node. For example, after the user device enables edge services on a VM, the user device sets its status 'available'. In one example, the user device can become the lead edge node. If not, the lead edge node can add the user device to the edge team when the lead edge needs extra computing resource and the user device is qualified, which can cause the lead edge node to consider the user device when distributing edge services, as described below.

At stage 120, the lead edge node can receive a request for a service from an endpoint device. In an example, the lead edge node can receive the request based on the request being made to a specific port. For example, edge computing service can be assigned a unique port number within a network on which to operate. When a computing node operates as an edge node, the VM edge application can configure the edge node to communicate on the port(s) associated with the service(s) that the VM provides. When an endpoint device makes a request for a service, the endpoint device can make the request using the assigned port, and the lead edge node can be configured to listen for requests for that service on the assigned port.

As an example, the endpoint device can be an Internet gaming machine. When a user starts the gaming, the gaming machine can send a request using a port number assigned to the gaming service. This can cause the lead edge node for the gaming service to receive the request. Likewise, the lead edge nodes for other VM-provided services can receive requests associated with their respective VMs based on the port on which the request is made.

At stage 130, the lead edge node can determine that it does not have sufficient computing resources available to provide the requested service to the endpoint device. For example, the lead edge node, in addition to responding to service requests related to the VM, can also distribute the handling of service requests to other edge nodes. When the lead edge node receives a request for edge computing services, the lead edge node can analyze its available computing resources to determine whether it can handle the request or not. In one example, the lead edge node can also compare the computing resources of other edge nodes in the team to determine if another edge node is better equipped to provide the requested service.

In an example, if an edge node cannot provide the requested service, or if another edge node is better equipped to do so, then the lead edge node can select another edge node to help serve the request. For example, at stage 130, the lead edge node can select the user device to provide the requested service. In an example, the lead edge node can select the user device over other edge nodes in the edge team based on various factors. Some examples of factors can include computing resource availability, whether an edge node is in motion, network connection strength, network speed, strength of network security, and access permissions.

In one example, one or more edge nodes in the edge team can designate a time window in which they can operate on the edge team. The lead edge node can determine an estimated completion time for the request and remove from consideration any edge nodes in the edge team that would not have time to complete the task. In one example, the lead edge node can select such an edge node only when no other edge nodes are available to assign the request to. In such an example, the lead edge node can communicate with the VMM system that another edge node will be needed, and the VMM system can attempt to equip another node as edge node to add to the edge team. In one example, the VMM system can remotely enable the user device. The lead edge node can communicate to the VMM system that additional computing resources are needed for an edge service in the geographic area of the lead edge node. The VMM system can help determine whether any computing nodes in the area can be added to the edge team. In another example, the VM application can include an option that allows the VMM system to remotely activate the computing node when needed. The VM application can periodically send location data to the VMM system so that the VMM system knows where the computing node is. In an instance where the computing node is in an area where edge services are needed, the VMM system can send instructions to the computing node to activate edge mode to help edge services.

At stage 140, the lead edge node can send instructions to the user device for assisting in providing the requested service. For example, the lead edge node can send a data message or file to the user device that indicates the service to provide and how to communicate with the endpoint device. As an example, the endpoint device can request access to an application. The lead edge node can select the user device and send instructions indicating the application that the endpoint device requested. The lead edge node can also send a network address, such as an Internet Protocol ("IP"), of the endpoint device. The user device can then communicate with the endpoint device to provide access to the application. In some examples, the user device can provide edges services through the lead edge node without communicating directly with the endpoint device. For example, the lead edge node can assign computing tasks to the user device that the user device can perform without direct communication with the endpoint device.

In one example, the VMM system can assign a reputation score to edge nodes based on performance metrics when providing edge services. For example, the VMM system can increase an edge node's score each time it performs a positive action, such as being available for edge servicing or providing edge services to endpoint devices. The VMM system can decrease scores for negative actions, such as prematurely terminating edge services, poor network performance, and so on. In one example, the reputation scores can be used by lead edge nodes as a factor when distributing edge services. In another example, the scores can be used as part of a financial reward system to incentive users to make their devices available as edge nodes. For example, users can be paid each time the user's device participates as an edge node, and the amount can depend on various factors, such as the amount of time spent available as an edge node, the amount of time spent providing edge services, the performance score, and so on.

The example method of FIG. 1B shows how the lead edge node in an autonomous edge can dynamically assign edge services to user devices. At stage 150, the lead node can receive a request for a service from an endpoint device. For example, when the endpoint device needs access to a back-end service or application, the endpoint device can communicate with edge nodes in the area that can provide the needed service. In one example, the endpoint device can select the best available edge node, which can be based on a variety of factors, such as computing resource availability, whether an edge node is static or in motion, network connection strength, network speed, strength of network security, and access permissions. The selected edge node can become the lead edge node for providing the service to the endpoint device.

At stage 160, the lead edge node can identify a user device that is available in edge mode and can assist in providing the requested edge services. For example, after enabling edge mode, the user device can set an availability status that the lead edge node can see what searching for other edge nodes to assist. If the ledge edge nodes determines that assistance is needed, such as when the lead edge node does not have sufficient computing resources for the requested service, then the lead edge node add an available edge node to its team.

In an example, the user device can be selected based on the user device already having the VM installed. For example, user devices can be assigned one or more VMs to keep installed. When searching for an edge node to add to the team, the lead edge node can determine the availability and qualifications of user devices, and other types of nodes, that already have the VM installed. In one example, the user device can identify VMs it has installed when setting its availability status. The lead edge node can select the user device based on the user device having the needed VM already installed.

At stage 170, the lead edge node can send instructions to the user device for assisting in providing the requested service. This can include sending to the user device the information needed to communicate with the endpoint device. For example, the lead edge node can send a network address of the endpoint device, an identifier of the particular service to provide to the endpoint device, and any necessary security certificates or encryption keys. The user device can then begin providing the service to the endpoint device. In some examples, the user device can provide edges services through the lead edge node without communicating directly with the endpoint device. For example, the lead edge node can assign computing tasks to the user device that the user device can perform without direct communication with the endpoint device.

By installing VMs on an on-demand basis as described herein, user devices can dynamically provide edge services based on the particular needs in a local area. For example, if an Internet gaming service is overloaded, user devices in edge mode can be selected to step in and assist by running the appropriate VM. Using VMs to provide edge services also allows user devices to provide edge services to endpoint devices that do not run on the same operating system. As an example, an endpoint device can be a laptop running a MACOS operating system. If the user of the laptop needs access to an application, any edge node in the area, regardless of the OS they are running, can provide the required edge services by running the appropriate VM. For example, the laptop can select a lead edge node, and the lead edge node can assign an ANDROID device to assist. The ANDROID device can provide edge services to the laptop by running a MACOS VM for the application.

FIG. 2 is a sequence diagram of an example method for distributing computing resources in an autonomous edge when providing a VM as a service. At stage 202, the user device can enable the VM edge application. In one example, a user can selectively launch the VM edge application. In another example, the VM edge application can run in the background of the user device and automatically enable itself at a scheduled time. In another example, the VMM system can send instructions to the user device that cause the user device to enable the VM edge application. At stage 204, the first edge device can notify the VMM system that edge mode is enabled. For example, the first edge device can send a message or data file indicating that the first edge device is ready to provide edge services through a VM.

At stage 206, the VMM system can suggest a VM to assign to the user device. For example, the VMM system can analyze the activities from all edge nodes, schedules of edge nodes that are scheduled to become unavailable within a time frame, and so on, or do some ML involved analysis. In one example, the VMM system can apply the analysis result to the edge teams in the geographical area of the user device. Because different services can utilize different VMs at the edge, the VMM system can determine which services need edge support in the location of the user device. For example, there may be no edge support for a particular service at the location of the user device. Alternatively, current edge capacity for the service can be full or within a threshold level towards full capacity at that location. As a result, the VMM system can select a node to enable edge mode by installing VM that corresponds to the service. Running the VM at the edge node can provide additional edge computing resources for that service.

At stage 208, the VMM system can send an installation file for the VM to the user device user device, and the user device can install the VM at stage 210. In one example, the VMM system can first determine whether the VM is already installed on the user device. For example, if the user device had previously provided edge services on a the particular VM, or if the user device has been assigned to keep the VM installed for future uses, then stages 208 and 210 can be skipped. If the VM is not installed on the user device user device, then the VMM system can transfer the download file to the user device user device. For example, the VMM system can send the installation file using a Hypertext Transfer Protocol ("HTTP") call, API call, or using another transfer protocol.

At stage 212, the user device can become available as an edge node. In an example, this stage can be performed by the VM edge application. For example, the VM edge application can make some or all available computing resources on the user device dedicated to providing edge services. Similar to stage 202 above, this can be done by user input, based on a schedule, or based on instructions from the VMM system, depending on the example.

At stage 214, the lead edge device can assess computing resource needs for edge service. For example, the lead edge node can analyze computing resource availability, mobility, network connection information, edge node availability schedules, and access permissions of edge nodes in the edge team. Based on a set of rules, the lead edge node can determine how to best distribute edge services amongst the edge team. In one example, the lead edge node can handle service requests for the edge service until additional resources are needed. The lead edge node can then delegate service requests to other edge nodes in the edge team.

At stage 216, the lead edge node can distribute computing tasks to the user device. For example, the lead edge can select the user device for providing certain edge services to one or more endpoint devices. In one example, the lead edge device can send instructions to the user device for providing the edge services. For example, the lead edge node can send a data message or file to the user device that indicates the service to provide, which endpoint devices to provide the service to, and how to communicate with the endpoint device. The user device can then begin providing the edge service to the indicated endpoint device.

FIGS. 3-5 are sequence diagrams of example methods for handling instances where an edge node stops operating as an edge node. The example methods described below begin when a user device on an edge team is actively providing edge services. As an example, the following examples can occur after the lead edge node distributes computing task to the first edge device in stage 216 of FIG. 2 above. The example method illustrated in FIG. 3 relates to disabling the user device as an edge node based on a request from the user device.

At stage 302, the lead edge node can inform the VMM system that an application or service from the VM is running on the user device. For example, the lead edge node can regularly update the VMM system indicating when edge nodes in the edge team are actively providing an edge service to an endpoint device. The VMM system can store the status of each edge node and respond to edge service termination requests based on whether the requesting edge node is actively providing an edge service.

For example, at stage 304, the user device can send a request to the VMM system to disable edge services. In one example, the request can originate from a user of the user device. For example, providing edge services can limit a user's access to his or her node. If the user wants to regain full access to the user device, the user can request to terminate edge services from within the VM edge application. The VM edge application can send the request to the VMM system using an HTTP or API call, for example. In another example, the VM edge application on the user device can automatically send the request based on a scheduled termination time. As an example, if the user device is scheduled to be available in edge mode from 6:00 PM until 9:00 PM, the VM edge application on the user device can send a disable request at 9:00 PM or a predetermined amount of time before the end of the scheduled availability time, such as five minutes before.

At stage 306, the VMM system can instruct the user device to wait due to the VM application running on the user device. For example, the VMM system can be configured to require edge nodes to finish any active edge operations before disabling edge mode. Upon receiving a disable request, the VMM system can check the status of the user device and determine that the edge operation is running on the user device. Based on that status, the VMM system can deny the request and instruct the user device to wait before disabling. In one example, the VMM system can apply a flag to the user device where the edge node statuses are stored. The flag can cause the VMM system to instruct the user device to disable edge mode after receiving a new status update indicating that the user device is no longer providing an edge service. In another example, the VMM system can instruct the lead edge node to not assign any further edge operations to the user device. This can prevent the lead edge node from assigning another edge operation to the user device before the VMM system can instruct the user device to disable edge operations.

At stage 308, the user device can wait for further instructions from the VMM system. For example, the user device can continue providing the edge service that it was providing when the request was sent. In one example, the VM edge application can prevent the user from manually overriding the wait instructions so that the edge operations are not interrupted.

At stage 310, the lead edge node can inform the VMM system that the application has finished running on the user device. For example, edge nodes in the edge team can update the lead edge node when an assigned operation is completely so that the lead edge node can assign another job if needed. The lead edge node can also send the availability updates to the VMM system. In one example, the user device can send the status update directly to the VMM system. In another example, because disabling edge mode has been requested, the VM edge application can be configured to deny any further edge services assigned by the lead edge node.

At stage 312, the VMM system can instruct the first edge device to disable edge services per the request. In one example where the VMM system flagged the user device after the request, the flag can trigger the VMM system to send the disable instructions when the VMM system updates the status of the user device. At stage 314, the user device can disable edge services for the VM. For example, the VM edge application can disable edge mode and return the user device to its normal operating mode.

FIG. 4 is another sequence diagram of an example method for transferring edge operations when the user device unexpectedly becomes unavailable. At stage 402, the lead edge node can inform the VMM system that an application or service is running on the user device. For example, the lead edge node can regularly update the VMM system indicating when edge nodes in the edge team are actively providing an edge service to an endpoint device. The VMM system can store the status of each edge node and respond to edge service termination requests based on whether the requesting edge node is actively providing an edge service.

Stages 404 and 406 can be optional stages that can occur if the user requests to disable edge operations, receives wait instructions, and then disables edge operations before receiving approval to do so. For example, at stage 404, the user device can send a request to the VMM system to disable edge services. In one example, the request can originate from a user of the user device. For example, providing edge services can limit a user's access to his or her node. If the user wants to regain full access to the user device, the user can request to terminate edge services from within the VM edge application. The VM edge application can send the request to the VMM system using an HTTP or API call, for example. In another example, the VM edge application on the user device can automatically send the request based on a scheduled termination time.

At stage 406, the VMM system can instruct the user device to wait due to the VM application running on the user device. For example, the VMM system can be configured to require edge nodes to finish any active edge operations before disabling edge mode. Upon receiving a disable request, the VMM system can check the status of the user device and determine that the edge operation is running on the user device. Based on that status, the VMM system can deny the request and instruct the user device to wait before disabling.

At stage 408, the user device can disable edge operations without approval from the VMM system. This can include any event in which the user device becomes unavailable or unreachable without prior warning. For example, the user can terminate the VM edge application, the user can shut down the user device, the user device can lose its network connection, or the user device can be moved out of the reachable range of the edge team.

At stage 410, the lead edge node can detect that the user device is unavailable. In one example, the lead edge node can periodically ping edge nodes in the edge team. No response from an edge node can indicate that the edge node is unexpectedly unavailable and therefore no longer providing the assigned edge operations.

At stage 412, the lead edge node can notify the VMM system that the first edge is suddenly unavailable or unreachable. Then, at stage 414, the lead edge node can assess the remaining edge nodes in the edge team. For example, the lead edge node can assess the computing resource availability, whether an edge node is in motion, network connection strength, network speed, strength of network security, access permissions, time spent as an edge node, and reputation score of the edge nodes.

Based on the assessment, at stage 416, the lead edge node can select the second edge node as the best replacement for the user device. Then at stage 418, the lead edge node can transfer the edge operations to the second edge node. For example, the lead edge node can indicate the application or service that was being provided and the endpoint device it was being provided to. In one example, the lead edge node can indicate what operation needs to next be performed by the second edge node. The lead edge node can send this information to the second edge node so that the second edge node can share the computing load of the edge service with the lead edge node.

In an example, at stage 420, the lead edge node can notify the VMM system that the edge operations were successfully transferred to the second edge node, and the VMM system can update its database accordingly. In one example, at stage 422, the VMM system can reduce the reputation score of the user device for terminating edge operations before completion. This can reduce the likelihood or frequency of the user device being selected for edge operations in the future. In another example, the VMM system can increase the reputation score of the second edge node for accepting the edge operation transfer. In one example, the early termination can reduce or eliminate any financial compensation for the user of the user device.

FIG. 5 is another sequence diagram of an example method for disabling the user device as an edge node. In this example method, the VM edge application provides an option for a user to override a wait instruction from the VMM system and disable edge operations. At stage 502, the lead edge node can inform the VMM system that an application or service is running on the user device. The VMM system can store the status update in a storage location, such as a hard drive or database.

At stage 504, the user device request permission from the VMM system to disable edge services. In one example, the request can originate from a user of the user device. For example, providing edge services can limit a user's access to his or her device. If the user wants to regain full access to the user device, the user can request to terminate edge services from within the VM edge application. The VM edge application can send the request to the VMM system using an HTTP or API call, for example. In another example, the VM edge application on the user device can automatically send the request based on a scheduled termination time.

At stage 506, the VMM system can instruct the user device to wait due to the VM application running on the user device. For example, the VMM system can be configured to require edge nodes to finish any active edge operations before disabling edge mode. Upon receiving a disable request, the VMM system can check the status of the user device and determine that the edge operation is running on the user device. Based on that status, the VMM system can deny the request and instruct the user device to wait before disabling. In one example, the VMM system can apply a flag to the user device where the edge node statuses are stored. The flag can cause the VMM system to instruct the user device to disable edge mode after receiving a new status update indicating that the user device is no longer providing an edge service. In another example, the VMM system can instruct the lead edge node to not assign any further edge operations to the user device. This can prevent the lead edge node from assigning another edge operation to the user device before the VMM system can instruct the user device to disable edge operations.

At stage 508, the user device can request an override. For example, in response to the wait instruction, the VM edge application can display a prompt on the user device indicating that an edge operation is currently running on the user device and that edge services will be disabled after the edge operation has completed. In one example, the VM edge application can provide an option that the user can select to override the wait instruction. This can prevent the user from being able to use the user device in case of an emergency or other important event. As an example, the user device can be the user's cell phone, and while in edge mode the user may not be able to make phone calls. If the user urgently needs to make a call, the user can select to override the wait instruction to gain access to the first edge node's telephone capabilities.

In an example, in response to the user selecting to override the wait instruction, the VM edge application can notify the VMM system. Then, at stage 510, the VMM system can send instructions to the lead edge node to locate another edge node in the edge team for transferring the edge operations currently being provided by the user device. In an example, while the lead edge node works on transferring the edge operations to a new edge node, the user device can continue the edge operations.

At stage 512, the lead edge node can assess the remaining edge nodes in the edge team. For example, the lead edge node can assess the computing resource availability, whether an edge node is in motion, network connection strength, network speed, strength of network security, and access permissions of the edge nodes. Based on the assessment, at stage 514, the lead edge node can select the second edge node as the best replacement for the user device. Then at stage 516, the lead edge node can transfer the edge operations to the second edge node. For example, the lead edge node can indicate the application or service that was being provided, the device it was being provided to, and any information indicating what operation needs to occur next to ensure a seamless transition for the user.

At stage 518, the lead edge device can notify the VMM system that the edge operations were successfully transferred from the first edge to the second edge node. In response, at stage 520, the VMM system can instruct the user device that it can disable edge services. At stage 522, the first edge device can then disable the VM. For example, the VM edge application can disable edge mode and return the user device to its normal operating mode.

In one example, at stage 524, the VMM system can reduce the reputation score of the user device for terminating edge operations before completion. This can reduce the likelihood or frequency of the user device being selected for edge operations in the future. In another example, the VMM system can increase the reputation score of the second edge node for accepting the edge operation transfer. In one example, the early termination can reduce or eliminate any financial compensation for the user of the user device.

FIG. 6 is an illustration of an example system for providing a VM as a service used in autonomous edge 610. In an example, the autonomous edge 610 can correspond to the edge teams described herein. For example, the autonomous edge 610 can include multiple edge nodes 620*a-i* that can be used to distribute edge services to endpoint devices 630. The edge nodes 620*a-i* can be processor-based nodes, such as wired or wireless access points, servers, smart phones, or tablets. The edge nodes 620*a-i* can be part of the network infrastructure of a managed network or a computing device owned by or assigned to a user. The endpoint devices 630 can include any network-capable computing device, like a personal computer, tablet, cell phone, server, connected car, or IoT device, such as a VOIP phone, camera, sensor, or similar devices. In one example, the edge nodes 620*a-i* can communicate with each other. The endpoint is aware of the surrounding reachable edge nodes, and a lead edge node is selected based on mutual decision between an edge node and endpoint device. The lead edge device can utilize the computing resources from other edge nodes which it selected into the edge team (i.e. a subset of 620*a-i*) and manage distribution of computing tasks associated with the application requested by the endpoint device. The endpoint device itself can be an edge node as well. The lead edge node can receive requests for services and delegate the handling of such requests to the other edge nodes. As an example, if the endpoint device 630 selects the edge node 620*a* is the lead edge node, then the edge node 620*a* can handle the service request and, if necessary, assign computing tasks to edge nodes 620*b-i*.

In an example, the edge nodes 620*a-i* can be dynamically added or removed from the autonomous edge. As an example, initially the endpoint device 630 can choose the edge node 620*a* as the lead edge node for providing a service that the endpoint device 630 requests. The edge node 620*a* determines that its own computing resource are not enough to handle the request, so the edge node 620*a* recruits edge node 620*b* to the edge team and assign computing tasks to the edge node 620*b*. If the computing resource needs increase, the lead edge 620*a* can recruit edge node 620*c* into the team and assign computing tasks to the edge node 620*c* as well. The edge node 620*a* can continue adding the remaining edge nodes to the team as the need for computing resources increases.

The VMM system 640, edge nodes 620*a-i*, and endpoint devices 630 can communicate with each other using a wired or wireless connection, depending on the node's capabilities. Some examples can include a Local Area Network ("LAN"), Wireless LAN ("WLAN"), BLUETOOTH, WI-FI, and the Internet. In 6G wireless communication, the edge nodes 620*a-i* and the endpoint devices 630 can communication directly using sidelink technology, forming ad-hoc or mesh network. This can allow a user application to be served by a nearby edge node without sending the computing request to a distant edge location or server. Depending on the example, the VMM system 640, edge devices 620*a-i*, and endpoint devices 630 can exchange communications using one of various communication protocols, such as HTTP or API calls.

FIG. 7 is an illustration of an example user device 700 that can operate as an edge node. The user device 700 can be one or more processor-based devices, such as a personal computer, tablet, or cell phone. In an example, the user device 700 can correspond to one the edge nodes 620*a-i* in FIG. 6. The user device 700 can include a central processing unit ("CPU") 702, memory 704, and hard disk drive ("HDD") 706. In an example, the memory 704 can be random-access memory ("RAM").

In an example, the user device 700 can include a management application 708. The management application 708 can be a stand-alone application, part of an enterprise application, or part of an operating system. The management application 708 can be an application or software package that allows for remote management of the user device 700 by a node management system, such as a Unified Endpoint Management ("UEM") system. For example, the management application 708 can be responsible for ensuring that nodes that are enrolled in the UEM are up to date with compliance and security settings prior to accessing enterprise data and resources. The management application 708 can communicate with a management server of the UEM, allowing UEM management of the user device 700 based on compliance and security settings at the management server. The management application 708 can enforce compliance at the user device 700, such as by locking the user device 700, notifying an admin, or wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. In one example, the management application 708 can ensure that the user device 700 is compliant when providing edge services through a VM.

In an example, the user device 700 can include a VM edge application 710. The VM edge application 710 can be responsible for managing edge operations at the user device 700. For example, the edge application 710 can dynamically enable or disable edge functionality by reserving some or all computing resources of the user device 700 for edge operations. The computing resources can include to the CPU 702, memory 704, and HDD 706. In an example, the edge application 710 can communicate with a VMM system, such as the VMM system 640 in FIG. 6, set availability for edge services and identify which VM to provide edge services for. For example, a VM 712 can be stored on the user device 700 and managed by the VM edge application 710. When the user device 700 is available for edge operations, the VM edge application can communicate with the VMM system and a lead edge node to facilitate providing services through the VM 712 to endpoint devices. The VM 712 can be one of several selected by the lead edge node, depending on the service that needs edge support.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing a virtual machine ("VM") as a service, comprising:
receiving, at a lead edge node and from a first endpoint device, a request for a service;
selecting, at the lead edge node, a second endpoint device that is available to operate as an edge node, the second endpoint device having a VM installed thereon that causes the second endpoint device to perform edge operations; and
sending, by the lead edge node, instructions to the second endpoint device for assisting in providing the requested service to the first endpoint device, wherein the second endpoint device provides the requested service by running the VM.

2. The method of claim 1, wherein the lead edge node selects the second endpoint device based at least one of:
   a determination that the second endpoint device has more available computing resources for providing the requested service than other available endpoint devices,
   a reputation score associated with each of the available endpoint devices,
   whether the second endpoint device is moving or stationary, and
   a determination that the second endpoint device can finish providing the requested service before a time when the second endpoint device is scheduled to become unavailable to operate as an edge node.

3. The method of claim 1, further comprising:
   sending, to a server, a first status update relating to the second endpoint device, the first status update indicating that the second endpoint device is actively providing services to the first endpoint device;
   receiving, at the edge node, an indication that the second endpoint device has completed providing the requested service; and
   sending, to the server, a second status update relating to the second endpoint device, the second status update indicating that the second endpoint device is not actively providing services to the first endpoint device, wherein the server grants or denies requests from the second endpoint device to change availability based on whether the second endpoint device is actively providing services.

4. The method of claim 1, further comprising:
   receiving, at the lead edge node, instructions to transfer the providing of the requested service away from the second endpoint device;
   selecting, by the edge node, a third endpoint device for providing the requested service;
   transferring, from the second endpoint device and to the third endpoint device, the providing of the requested service; and
   notifying, by the edge node, the second endpoint device that the second endpoint device can stop operating as an edge node.

5. The method of claim 1, further comprising:
   determining, by the lead edge node, that the second endpoint device stopped providing the requested service to the edge node before the providing of the requested service was completed;
   selecting, by the lead edge node, a third endpoint device for providing the requested service; and
   transferring, by the edge node and to the third endpoint device, the providing of the requested service.

6. The method of claim 1, further comprising:
   determining, by the lead edge node, that the second endpoint device has not completed providing the requested service at a predetermined time, the predetermined time corresponding to a time when the second endpoint device is scheduled to not be available to operate as an edge node;
   selecting, by the lead edge node, a third endpoint device for providing the requested service; and
   sending, from the lead edge node and to the third endpoint device, instructions to provide the requested service to the first endpoint device.

7. The method of claim 1, wherein the lead edge node is also an endpoint device.

8. A non-transitory, computer-readable medium containing instructions that, when executed by a hardware-based processor, cause the hardware-based processor to perform stages for providing a virtual machine ("VM") as a service, the stages comprising:
   receiving, at a lead edge node and from a first endpoint device, a request for a service;
   selecting, at the lead edge node, a second endpoint device that is available to operate as an edge node, the second endpoint device having a VM installed thereon that causes the second endpoint device to perform edge operations; and
   sending, by the lead edge node, instructions to the second endpoint device for assisting in providing the requested service to the first endpoint device, wherein the second endpoint device provides the requested service by running the VM.

9. The non-transitory, computer-readable medium of claim 8, wherein the lead edge node selects the second endpoint device based at least one of:
   a determination that the second endpoint device has more available computing resources for providing the requested service than other available endpoint devices,
   a reputation score associated with each of the available endpoint devices,
   whether the second endpoint device is moving or stationary, and
   a determination that the second endpoint device can finish providing the requested service before a time when the second endpoint device is scheduled to become unavailable to operate as an edge node.

10. The non-transitory, computer-readable medium of claim 8, the stages further comprising:
   sending, to a server, a first status update relating to the second endpoint device, the first status update indicating that the second endpoint device is actively providing services to the first endpoint device;
   receiving, at the edge node, an indication that the second endpoint device has completed providing the requested service; and
   sending, to the server, a second status update relating to the second endpoint device, the second status update indicating that the second endpoint device is not actively providing services to the first endpoint device, wherein the server grants or denies requests from the second endpoint device to change availability based on whether the second endpoint device is actively providing services.

11. The non-transitory, computer-readable medium of claim 8, the stages further comprising:
   receiving, at the lead edge node, instructions to transfer the providing of the requested service away from the second endpoint device;
   selecting, by the edge node, a third endpoint device for providing the requested service;
   transferring, from the second endpoint device and to the third endpoint device, the providing of the requested service; and
   notifying, by the edge node, the second endpoint device that the second endpoint device can stop operating as an edge node.

12. The non-transitory, computer-readable medium of claim 8, the stages further comprising:
   determining, by the lead edge node, that the second endpoint device stopped providing the requested service to the edge node before the providing of the requested service was completed;

selecting, by the lead edge node, a third endpoint device for providing the requested service; and transferring, by the edge node and to the third endpoint device, the providing of the requested service.

13. The non-transitory, computer-readable medium of claim 8, the stages further comprising:

determining, by the lead edge node, that the second endpoint device has not completed providing the requested service at a predetermined time, the predetermined time corresponding to a time when the second endpoint device is scheduled to not be available to operate as an edge node;

selecting, by the lead edge node, a third endpoint device for providing the requested service; and sending, from the lead edge node and to the third endpoint device, instructions to provide the requested service to the first endpoint device.

14. The non-transitory, computer-readable medium of claim 8, wherein the lead edge node is also an endpoint device.

15. A system for providing a virtual machine ("VM") as a service, comprising:

a memory storage including a non-transitory, computer-readable medium comprising instructions; and a hardware-based processor that executes the instructions to carry out stages comprising:

receiving, at a lead edge node and from a first endpoint device, a request for a service;

selecting, at the lead edge node, a second endpoint device that is available to operate as an edge node, the second endpoint device having a VM installed thereon that causes the second endpoint device to perform edge operations; and sending, by the lead edge node, instructions to the second endpoint device for assisting in providing the requested service to the first endpoint device, wherein the second endpoint device provides the requested service by running the VM.

16. The system of claim 15, wherein the lead edge node selects the second endpoint device based at least one of:

a determination that the second endpoint device has more available computing resources for providing the requested service than other available endpoint devices, a reputation score associated with each of the available endpoint devices, whether the second endpoint device is moving or stationary, and a determination that the second endpoint device can finish providing the requested service before a time when the second endpoint device is scheduled to become unavailable to operate as an edge node.

17. The system of claim 15, the stages further comprising:

sending, to a server, a first status update relating to the second endpoint device, the first status update indicating that the second endpoint device is actively providing services to the first endpoint device;

receiving, at the edge node, an indication that the second endpoint device has completed providing the requested service; and sending, to the server, a second status update relating to the second endpoint device, the second status update indicating that the second endpoint device is not actively providing services to the first endpoint device, wherein the server grants or denies requests from the second endpoint device to change availability based on whether the second endpoint device is actively providing services.

18. The system of claim 15, the stages further comprising:

receiving, at the lead edge node, instructions to transfer the providing of the requested service away from the second endpoint device;

selecting, by the edge node, a third endpoint device for providing the requested service;

transferring, from the second endpoint device and to the third endpoint device, the providing of the requested service; and notifying, by the edge node, the second endpoint device that the second endpoint device can stop operating as an edge node.

19. The system of claim 15, the stages further comprising:

determining, by the lead edge node, that the second endpoint device stopped providing the requested service to the edge node before the providing of the requested service was completed;

selecting, by the lead edge node, a third endpoint device for providing the requested service; and transferring, by the edge node and to the third endpoint device, the providing of the requested service.

20. The system of claim 15, the stages further comprising:

determining, by the lead edge node, that the second endpoint device has not completed providing the requested service at a predetermined time, the predetermined time corresponding to a time when the second endpoint device is scheduled to not be available to operate as an edge node;

selecting, by the lead edge node, a third endpoint device for providing the requested service; and sending, from the lead edge node and to the third endpoint device, instructions to provide the requested service to the first endpoint device.

* * * * *